United States Patent
Suerer et al.

(10) Patent No.: US 9,708,516 B2
(45) Date of Patent: Jul. 18, 2017

(54) POLYURETHANE ADHESIVES CONTAINING ALKYL-SUBSTITUTED 4,4'-DI(AMINOCYCLOHEXYL)ALKANES, 2,4'-DI(AMINOCYCLOHEXYL)ALKANES AND/OR 2,2'-DI(AMINOCYCLOHEXYL)AMINES

(71) Applicant: DOW GLOBAL TECHNOLOGIES LLC, Midland, MI (US)

(72) Inventors: Bradley D. Suerer, Lake Jackson, TX (US); Syed Z. Mahdi, Rochester Hills, MI (US); Gary L. Jialanella, Oxford, MI (US); Gary A. Hunter, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/410,307

(22) PCT Filed: Jun. 26, 2013

(86) PCT No.: PCT/US2013/047962
§ 371 (c)(1),
(2) Date: Dec. 22, 2014

(87) PCT Pub. No.: WO2014/004710
PCT Pub. Date: Jan. 3, 2014

(65) Prior Publication Data
US 2015/0368529 A1 Dec. 24, 2015

Related U.S. Application Data

(60) Provisional application No. 61/664,294, filed on Jun. 26, 2012.

(51) Int. Cl.
*C09J 175/06* (2006.01)
*C09J 175/04* (2006.01)
(Continued)

(52) U.S. Cl.
CPC ............ *C09J 175/06* (2013.01); *C08G 18/10* (2013.01); *C08G 18/12* (2013.01);
(Continued)

(58) Field of Classification Search
CPC ............ C08G 18/6696; C08G 18/3234; C08G 18/6529
(Continued)

(56) References Cited

U.S. PATENT DOCUMENTS

| 4,248,756 A | 2/1981 | Konig |
| 4,623,702 A | 11/1986 | Grieves |

(Continued)

FOREIGN PATENT DOCUMENTS

| CA | 2295548 A | 1/1999 |
| DE | 19729982 A | 1/1999 |

(Continued)

OTHER PUBLICATIONS

Covestro. Product data sheet for ARCOL PPG 1025. Evidentiary reference. Jan. 9, 2013.*

*Primary Examiner* — Mike M Dollinger
(74) *Attorney, Agent, or Firm* — Gary C Cohn PLLC

(57) ABSTRACT

Two component polyurethane adhesives contain (a) at least one alkyl-substituted 4,4'-di(aminocyclohexyl)alkane wherein each cyclohexyl group is alkyl-substituted in at least one position ortho to the amino group, (b) at least one 2,4'-di(aminocyclohexyl)alkane or 2,2'-di(aminocyclohexyl)alkane, (c) a mixture of (ii) at least one alkyl-substituted 4,4'-di(aminocyclohexyl)alkane wherein each cyclohexyl group is alkyl-substituted and (ii) at least one 2,4'-di(aminocyclohexyl)alkane and/or 2,2'-di(aminocyclohexyl)alkane, or (d) a mixture of 40 to 99.9% by weight (a), (b) or (c) with 0.1 to 60% by weight of at least one unsubstituted 4,4'-di(aminocyclohexyl)alkane, The adhesives also contain
(Continued)

one or more polyols, in which at least 50% of the hydroxyl groups are secondary hydroxyls. These adhesive provide a useful combination of long open time and excellent sag resistance.

14 Claims, 1 Drawing Sheet

(51) Int. Cl.

| | | |
|---|---|---|
| C08G 18/10 | (2006.01) | |
| C08G 18/12 | (2006.01) | |
| C08G 18/32 | (2006.01) | |
| C08G 18/48 | (2006.01) | |
| C08G 18/66 | (2006.01) | |
| C08G 18/36 | (2006.01) | |
| C08K 3/26 | (2006.01) | |
| C08K 3/36 | (2006.01) | |

(52) U.S. Cl.
CPC ......... *C08G 18/3234* (2013.01); *C08G 18/36* (2013.01); *C08G 18/4829* (2013.01); *C08G 18/6696* (2013.01); *C08K 3/26* (2013.01); *C08K 3/36* (2013.01); *C09J 175/04* (2013.01); *C08K 2003/265* (2013.01)

(58) Field of Classification Search
USPC ....................................................... 525/452
See application file for complete search history.

(56) References Cited

U.S. PATENT DOCUMENTS

| | | | | |
|---|---|---|---|---|
| 5,312,886 | A * | 5/1994 | House | C08G 18/3234 528/64 |
| 5,464,921 | A | 11/1995 | Laas | |
| 5,607,998 | A * | 3/1997 | Markusch | B29C 73/02 156/327 |
| 6,060,574 | A | 5/2000 | Schmalstieg | |
| 2002/0077444 | A1 | 6/2002 | Matsumoto | |
| 2005/0158131 | A1 | 7/2005 | Markusch | |
| 2006/0276609 | A1* | 12/2006 | Lysenko | C08G 18/36 528/44 |
| 2008/0160187 | A1* | 7/2008 | Murata | C03C 17/28 427/164 |
| 2009/0092811 | A1 | 4/2009 | Chasser | |
| 2010/0076143 | A1* | 3/2010 | Yakulis | C08G 18/3234 524/500 |
| 2010/0108260 | A1* | 5/2010 | Rasche | C08G 18/10 156/331.4 |
| 2012/0035001 | A1 | 2/2012 | Xie | |

FOREIGN PATENT DOCUMENTS

| | | |
|---|---|---|
| DE | 10151709 A | 5/2002 |
| EP | 0 950 675 A | 10/1999 |
| WO | 2008/095915 A | 8/2008 |
| WO | 2009/006034 A | 1/2009 |
| WO | 2012/054922 A | 4/2012 |
| WO | 2012/078331 A | 6/2012 |

* cited by examiner

POLYURETHANE ADHESIVES CONTAINING ALKYL-SUBSTITUTED 4,4'-DI(AMINOCYCLOHEXYL)ALKANES, 2,4'-DI(AMINOCYCLOHEXYL)ALKANES AND/OR 2,2'-DI(AMINOCYCLOHEXYL)AMINES

Polyurethanes form very strong bonds to many materials and for that reason are commonly used as adhesive materials. The actual adhesive material is a curable mixture that contains one or more isocyanate compounds and, in most but not all cases, one or more curing agents. The uncured adhesive is applied to the substrates and cured in contact with the substrates to form a strong adhesive bond between them.

Polyurethane adhesives are very versatile because they can be formulated to be useful in a very wide range of adhesive applications. The formulations are in each case designed to have necessary physical and adhesive attributes, and also to have the necessary curing profile under the particular curing conditions that can be brought to bear to the particular application.

Thus, for example, in specific applications, the cured adhesive may be cellular or non-cellular; flexible, semi-flexible or rigid; one- or two-component; slow-curing or fast-curing; room temperature curable or curable only with applied heat.

For some applications, it is necessary to formulate the adhesive to provide for a long "open time", i.e. a prolonged period after the adhesive composition is fully formulated during which the composition can be applied and manipulated before it is cured. For example, when bonding parts having large bonding surfaces, a significant amount of time may be needed to apply the adhesive to the entire bonding surface and then to bring the substrates into the bonding position. Several problems can result if the adhesive cures prematurely. There may be areas where the adhesive bond is weak because the adhesive cured before the parts were brought together. The adhesive might not flow as the parts are married to cover the entire bond surface, which can lead to inconsistent thickness in the cured adhesive and inconsistent bond strength over the bond surface.

One way to obtain a long "open time" is to formulate the adhesive with "blocked" reactants or catalysts, which become activated only when heated to some predetermined temperature range. For example, the isocyanate component can be blocked with materials such as phenols, certain amines and certain mercaptan compounds that form a weak bond to the isocyanate group. When heated, these blocking groups de-block, regenerating a free isocyanate group that can react with a curing agent to cure the adhesive. Similarly, various types of blocked heat-activatable catalysts can be used to the same effect.

A significant problem with using these blocked isocyanates and catalysts is that they can release volatile organic compounds when the isocyanates and/or catalyst become de-blocked. The release of volatile organic compounds is undesirable in most adhesive applications because of the potential of exposure, and because the volatile organic compounds can form voids in the adhesive layer or interfere with the bond to the substrate.

A problem with slow-curing, long open time polyurethane adhesive systems is that they tend to flow off the parts before they can cure. The components of the uncured adhesive often are formulated to have a low viscosity, so they can be metered and applied easily. The low viscosity makes the adhesive more apt to flow off the substrates, particularly if the substrate is an inclined or vertical surface, or if the adhesive is applied to the underside of the substrate.

To combat this last problem, the adhesive can be formulated to have "thixotropic" properties, by which it is meant that the uncured adhesive exhibits a high apparent viscosity under quiescent conditions but thins rapidly upon the application of shear. This allows the adhesive to be metered, dispensed and formed into a layer easily while enabling it to remain in place without sagging or flowing off.

One way to impart thixotropic properties is to include an agent such as fumed silica into the formulation. Another way is to include a small quantity of a fast-reacting isocyanate-reactive material, typically a diamine, into the formulation. The diamine reacts rapidly with a small portion of the polyisocyanate to form oligomeric species. These provide a small amount of early thickening which reduces run-off in the early stages of cure. The problem with the diamine approach is that it is difficult to find a proper balance between the early development of viscosity and maintaining an adequate open time. If enough of the diamine is used to obtain the wanted rheological properties, open time tends to be shortened significantly, in part because the heat released in the exothermic reaction of the diamine increases the temperature, speeding the remaining cure and shortening the open time.

This invention is in one aspect a two-component polyurethane adhesive composition comprising an isocyanate component and a curative component, wherein the isocyanate component is an aromatic polyisocyanate or mixture of aromatic polyisocyanates and the curative component is a mixture containing (1) one or more polyols wherein at least 50% of the hydroxyl groups provided by said polyol(s) are secondary hydroxyl groups and (2) at least one polyamine compound having at least two primary or secondary amine groups, wherein the polyamine compound constitutes 0.75 to 5% of the combined weight of the polyamine compound(s) and the polyol(s) and further wherein the polyamine compound is (a) at least one alkyl-substituted 4,4'-di(aminocyclohexyl) alkane wherein each cyclohexyl group is alkyl-substituted in at least one position ortho to the amino group;

(b) at least one 2,4'-di(aminocyclohexyl)alkane or 2,2'-di (aminocyclohexyl)alkane;

(c) a mixture of (i) at least one alkyl-substituted 4,4'-di (aminocyclohexyl)alkane wherein each cyclohexyl group is alkyl-substituted and (ii) at least one 2,4'-di(aminocyclohexyl)alkane and/or 2,2'-di(aminocyclohexyl)alkane; or (d) a mixture of 40 to 99.9% by weight (a), (b) or (c) with 0.1 to 60% by weight of at least one unsubstituted 4,4'-di (aminocyclohexyl)alkane, and further wherein the polyol component contains no more than 0.25 weight percent of other primary or secondary amine-containing compounds.

The polyurethane adhesive composition of the invention is characterized in having a long open time at ambient temperatures (from 15 to 50° C., especially 15 to 35° C.), and in having excellent sag resistance. The adhesive composition is useful in a wide variety of adhesive applications. It is particularly suitable for applications in which there are very large bond areas, such as 0.25 square meter or larger; in applications in which an ambient temperature cure is required; in applications in which the adhesive is applied to an inclined or vertical surface, or to the underside of a substrate; and in applications in which a long working time is needed.

The invention is also a process for bonding two substrates, comprising mixing the polyol component and the isocyanate component of the two-component polyurethane adhesive composition of the invention at an isocyanate index of 85 to 150 to form an adhesive mixture, forming a layer of the adhesive mixture between and in contact with the two substrates, and curing the adhesive mixture between and in contact with the two substrates to form a layer of cured adhesive bonded to each of the two substrates.

Figure 1:
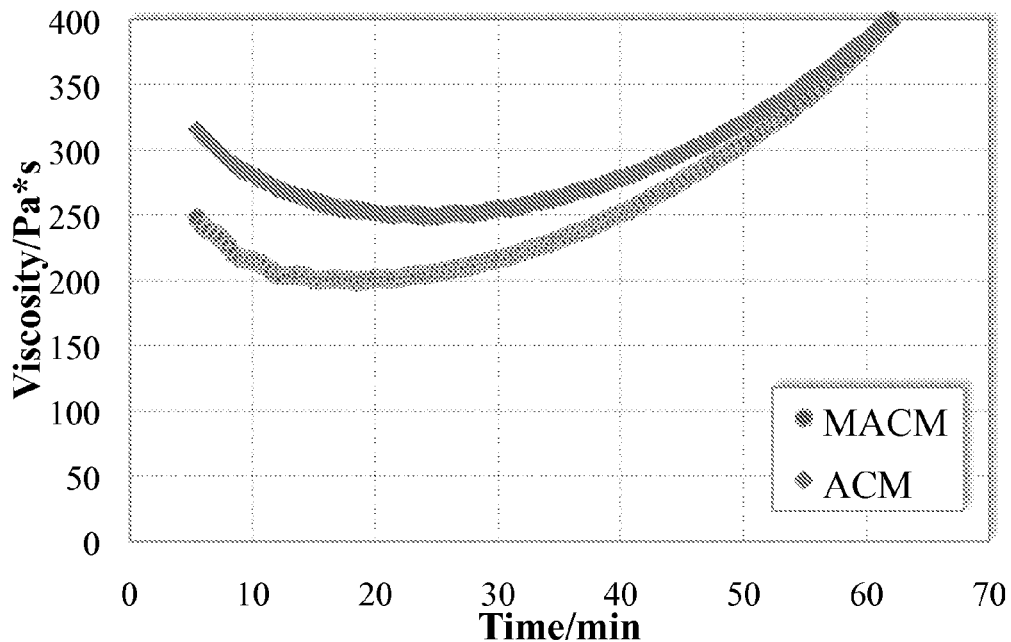
FIG. 1 is a graph showing the change in viscosity over time of an adhesive composition of the invention (Example 1) and a comparative adhesive (Comp. Sample A).

The isocyanate component includes one or more aromatic polyisocyanates. The organic isocyanate compound(s) contain an average of at least 2.0 isocyanate groups per molecule. The polyisocyanate(s) may contain an average as many as 8 isocyanate groups per molecule, but typically contain no more than about 4 isocyanate groups per molecule on average. The organic polyisocyanate may have an isocyanate equivalent weight as little as about 85 and as much as about 2000, but a preferred isocyanate equivalent weight is from about 125 to 300. Examples of suitable isocyanate compounds include m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate compound is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, so-called "liquid MDI" products, and the like.

The curative component contains one or more polyols. At least 50% of the hydroxyl groups provided by such polyols are secondary hydroxyl groups. It is more preferred that at least 75%, and still more preferred that at least 90%, of the hydroxyl groups are secondary hydroxyl groups. If desired, up to 100% of the hydroxyl groups may be secondary. Secondary hydroxyl groups are less reactive towards isocyanate groups than are primary hydroxyl groups; therefore the predominance of secondary hydroxyl groups favors longer open times.

The individual polyol(s) in the curative component may have hydroxyl equivalent weights of 31 to 2500 or more. A preferred average hydroxyl equivalent weight for the polyol(s) in the curative component is 60 to 500, and a more preferred average hydroxyl equivalent weight is 100 to 350.

The individual polyol(s) in the curative component may have hydroxyl functionalities (number of hydroxyl groups per molecule) from 1 to 8 or more, preferably from 2 to 6. The average functionality for the polyol(s) in the curative component is preferably from 2 to 6, more preferably from 2.5 to 4 and still more preferably from 2.5 to 3.5.

Preferred polyols are devoid of primary, secondary and tertiary amino groups, as the presence of such groups tends to reduce open time through rapid reaction with the isocyanates (in the case of primary or secondary amino groups) or due to catalytic effects (in the case of tertiary amino groups).

Examples of suitable polyols include, for example, polyester polyols, polyether polyols, hydroxyl-containing vegetable oils or animal fats, hydroxy-functional acrylate polymers and copolymers, hydroxy-functional polybutadiene polymers, and low molecular weight hydroxyl-compounds such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol)amine, glycerin, trimethylol propane, trimethylol ethane, pentaerythritol, sucrose, sorbitol, and the like.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers and random copolymers of propylene oxide and ethylene oxide in which the oxyethylene content is, for example, from about 1 to about 10% by weight of monomers. Especially preferred polyether polyols have hydroxyl equivalent weights from 100 to 500, especially 100 to 250, and a hydroxyl functionality of 2 to 6.

Useful hydroxyl-containing vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005. Castor oil is an especially useful hydroxyl-containing vegetable oil.

A preferred curative composition contains a mixture of (i) castor oil and (ii) one or more polyether polyols (preferably a poly(propylene oxide) homopolymer) having a hydroxyl equivalent weight of 100 to 500, especially 100 to 250 and a hydroxyl functionality of 2 to 6. It is especially preferred that the mixture of castor oil and this polyether polyol constitute at least 90%, more preferably at least 95% of the weight of all polyols in the curative composition. The mixture of castor oil and this polyether polyol may constitute all of the polyols in the curative composition.

The curative composition contains (a) at least one alkyl-substituted 4,4'-di(aminocyclohexyl) alkane wherein each cyclohexyl group is alkyl-substituted in at least one position ortho to the amino group;

(b) at least one 2,4'-di(aminocyclohexyl)alkane or 2,2'-di (aminocyclohexyl)alkane;

(c) a mixture of (i) at least one alkyl-substituted 4,4'-di (aminocyclohexyl)alkane wherein each cyclohexyl group is alkyl-substituted and (ii) at least one 2,4'-di(aminocyclohexyl)alkane and/or 2,2'-di(aminocyclohexyl)alkane; or (d) a mixture of 40 to 99.9% by weight (a), (b) or (c) with 0.1 to 60% by weight of at least one unsubstituted 4,4'-di(aminocyclohexyl)alkane.

The alkyl-substituted 4,4'-di(aminocyclohexyl)alkane is characterized in being an alkane substituted with two 4-aminocyclohexyl groups. The alkane preferably is gem-disubstituted with the two 4-aminocyclohexyl groups. The alkane preferably contains three or fewer carbon atoms. The alkane most preferably is methane. The 4-aminocyclohexyl groups each are alkyl-substituted in at least one of the positions ortho to the amino group. Thus, the aminocyclohexyl groups can be monoalkyl substituted at the 3- or 5-position, or alkyl-substituted at both the 3- and 5-positions. The alkyl substituents preferably have up to 4 carbon atoms and include, for example, methyl, ethyl, n-propyl, isopropyl, n-butyl, isobutyl and t-butyl. The alkyl substitutes can all be the same, or two or more different alkyl substituents can be present. Suitable alkyl-substituted 4,4'-di(aminocyclohexyl)alkanes include those having the structure:

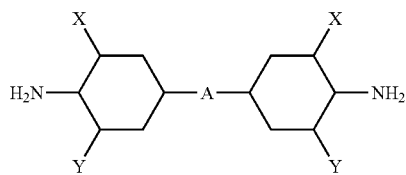

in which A is alkyl, which is preferably gem-substituted with the two aminocyclohexyl groups, each X is independently alkyl, preferably an alkyl having up to 4 carbon atoms, and each Y is independently hydrogen or alkyl having up to 4 carbon atoms. A preferably is propylidene, ethylidene or methylene. Each X is preferably methyl. Each Y is preferably hydrogen or methyl, and is most preferably hydrogen.

Specific alkyl-substituted 4-4'-di(aminocyclohexyl)alkane compounds include 3,3'-dimethyl-4,4'-diaminocyclohexyl methane; 3,3'-diethyl-4,4'-diaminocyclohexyl methane, 3,5,3',5'-tetramethyl-4,4'-diaminocyclohexyl methane, 3,5,3',5'-tetramethyl-4,4-diaminocyclohexyl methane, 3,3'-di-t-butyl-4,4'-diaminocyclohexyl methane, 3,5,3',5'-tetra-t-butyldiaminecyclohexyl methane and the like.

Suitable 2,4'-di(aminocyclohexyl)alkanes and 2,2'-di(aminocyclohexyl)alkanes include, for example, 2,4'-(di-aminocyclohexyl)methane, 2,2'-(diaminocyclohexyl)methane, gem-2,4'-di(aminocyclohexyl) ethane, gem-2,2'-di(aminocyclohexyl)ethane, 2,2-(2,4'-diaminocyclohexyl)propane, 2,2-(2,3'-diaminocyclohexyl)propane, 3'-alkyl substituted 2,4'-di(aminocyclohexyl)alkanes in which the 3' alkyl group contains 1 to 4 carbon atoms and the alkane contains 1 to 3 carbon atoms, 3,3'-dialkyl substituted 2,2'-di(aminocyclohexyl)alkanes in which the 3 and 3' alkyl groups each contains 1 to 4 carbon atoms and the alkane contains 1 to 3 carbon atoms, and 3',5'-dialkyl substituted 2,4'-di(aminocyclohexyl)alkanes wherein the 3' and 5' alkyl groups contain 1 to 4 carbon atoms and the alkane contains 1 to 3 carbon atoms.

The alkyl-substituted 4,4'-di(aminocyclohexyl)alkane, 2,4'-di(aminocyclohexyl)alkane or 2,2'-di(aminocyclohexyl)alkane can be the only primary or secondary amine compound present in the curative component. In some embodiments, a mixture of (i) at least one alkyl-substituted 4,4'-di(aminocyclohexyl)alkane and (ii) at least one 2,4'-di(aminocyclohexyl)alkane and/or 2,2'-di(aminocyclohexyl) alkane can be present. In such a mixture, the mentioned amine components can be present in any proportion, but preferably at least 50% by weight of such a mixture is a 4,4'-di(aminocyclohexyl)alkane.

In other embodiments, the alkyl-substituted 4,4'-di(aminocyclohexyl)alkane, 2,4'-di(aminocyclohexyl)alkane) and/or 2,2'-di(aminocyclohexyl)alkane is present as a mixture with one or more unsubstituted 4,4-di(aminocyclohexyl)alkanes. Such a mixture should contain at least 40%-99.9% by weight, more preferably at least 50% by weight of the alkyl-substituted 4,4'-di(aminocyclohexyl)amine, 2,4'-di(aminocyclohexyl)alkane and/or 2,2'-di(aminocyclohexyl) alkane and 0.1 to 60% by weight, preferably no more than 50% by weight of the unsubstituted 4,4'-di(aminocyclohexyl)alkane(s). The alkane group preferably contains 1 to 3 carbon atoms and preferably is gem-disubstituted with the aminocyclohexyl groups. An example of a suitable unsubstituted 4,4'-di(aminocyclohexyl)alkane is 4,4'-diaminocyclohexyl methane.

The foregoing amines or amine mixtures constitute 0.75 to 5% of the combined weight of the amine(s) and the polyol(s) in the curative component. A preferred amount is from 1 to 4% and a more preferred amount is from 1 to 3%.

The curative component contains no more than 0.25 percent by weight of any primary or secondary amine compound, other than the amine or amine mixtures described above. It more preferably contains no more than 0.1 percent by weight of such other primary or secondary amine compounds.

The adhesive composition may contain various other components, which are optional and can be omitted if desired.

Among the optional components are various particulate fillers, which can be organic and/or inorganic. Fillers can be present, for example, to (1) help control the temperature increase due to the exothermic curing reaction, (2) adjust the physical properties of the uncured adhesive, (3) adjust the rheological properties of the uncured adhesive and/or (4) decrease overall cost per unit volume. The presence of a filler, for example, can adds mass to the adhesive composition and in that manner can act as a heat sink, reducing the temperature increase that is seen as the adhesive cures. This can be important because the viscosity of the reaction mixture tends to decrease significantly during early stages of cure; reducing the amount of temperature rise can help to decrease the tendency for the adhesive to run-off. Therefore, it is preferred that the adhesive contains a particulate filler. The particulate filler can be incorporated into the isocyanate component, the curative component or both. The amount of particulate filler (if present) may be, for example, 1 to 50%, or 5 to 35%, of the total weight of the adhesive composition (i.e. the combined weights of the isocyanate component and the curative component. Examples of filler materials include, for example, calcium carbonate, various clays, mica, talc, boron nitride, silicon nitride, boron carbide, mullite, titanium dioxide, glass, carbon, various cellulosic or lignocellulosic materials, various thermoset polymers and various high-melting thermoplastic polymers. The filler materials may be low (<5) aspect ratio particles, flakes, fibers or other useful physical form.

If a particulate filler is present, it is preferred to also include one or more wetting agents and/or coupling agents. If present, these may constitute 0.01 to 3% of the total weight of the adhesive composition.

A drying agent may be present, particularly if the cured adhesive is to be non-cellular. Suitable drying agents include molecular sieves and zeolite powder, as well as other water scavengers.

The adhesive composition of the invention may contain a thixotropic agent such as fumed silica. Such a thixotropic agent may constitute, for example, from 1 to 7% of the total weight of the adhesive composition.

If the cured adhesive is to be cellular, the adhesive composition will contain a blowing gas and/or frothing agent. Suitable blowing agents include physical types such as water and various carbamates, as well as physical types such as carbon dioxide, various hydrocarbons, fluorocarbons, hydrofluorocarbons, dialkyl ethers, hydrochlorofluorocarbons, and the like. Blowing agents are most typically blended into the curative component, but physical blowing agents can be instead (or in addition) be incorporated into the isocyanate component. Frothing agents include air, oxygen, nitrogen, helium, hydrogen, argon or other materials that are gasses at room temperature and one atmosphere pressure. Frothing agents are typically whipped into the adhesive composition after the isocyanate component and curative component are mixed. If the cured adhesive is to be non-cellular, these blowing agents and frothing agents are omitted from the adhesive composition.

If the cured adhesive is to be cellular, a surfactant is preferably present in the adhesive composition to stabilize the composition against cell collapse until it has cured. Silicone surfactants are preferred. Surfactants can be omitted if the adhesive is to be non-cellular. The surfactant, if present, can be present in either the isocyanate component, the curative component, or both.

The adhesive composition may contain one or more polyurethane curing catalysts. Suitable urethane-forming catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals,
salts of organic acids with a variety of metals, organometallic derivatives of tetravalent tin, trivalent and pentavalent As, Sb and Bi and metal carbonyls of iron and cobalt. Such catalysts may be a latent type, being blocked and/or encapsulated to become active only upon heating to a predetermined elevated temperature. If present, such a catalyst preferably is present in the curative component, but may be present in the isocyanate component as well. However, in some embodiments of the invention, it may be preferred to minimize the amount of such catalysts, especially tertiary amine catalysts and tin-containing catalysts, or to omit such catalysts altogether, as doing so tends to extend open time. In certain embodiments of the invention, the adhesive composition is devoid of tertiary amine and phosphine compounds, metal chelates, acidic metal salts of strong acids; strong bases, metal alcoholates, metal phenolates, metal salts of organic acids, organometallic derivatives of tetravalent tin, trivalent and pentavalent As, Sb and Bi, and metal carbonyls of iron and cobalt.

The invention is also a process for bonding two substrates. In general, the curative component and the isocyanate component are mixed to form a reaction mixture. The ratio of these materials is generally sufficient to provide an isocyanate index of 85 to 150, more preferably 90 to 125. "Isocyanate index" is 100 times the ratio of isocyanate groups to isocyanate-reactive groups provided to the reaction mixture by the isocyanate and curative components, respectively. The reaction mixture is formed into a layer between and in contact with the two substrates. The adhesive layer is then cured between and in contact with the two substrates to form a layer of cured adhesive bonded to each of the two substrates.

The methods used to mix the isocyanate component with the curative component, to form the adhesive layer and cure the adhesive are, broadly speaking, not critical and a variety of apparatus can be used to perform these steps. Thus, the isocyanate component and curative component can be mixed manually, in various types of batch apparatus, and/or using various sorts of automated metering, mixing and dispensing equipment.

The adhesive of the invention is particularly useful in applications in which a long open time at ambient temperature is necessary or desirable, as the excellent sag resistance of the adhesive prevents or at least reduces run-off. Several types of applications fall into this category. Applications in which there are very large bond areas, such as 0.25 square meter or more, especially one square meter or more, often require long open times to permit the adhesive composition to be applied over the entire bond area without premature curing in localized areas. In other cases, other manufacturing constraints require the adhesive to remain open for some period of time, such as at least 20 minutes, at least 30 minutes or at least 40 minutes, until the substrates can be married at the bond line. In other cases, there may be a need to perform certain intermediate steps between the time the isocyanate and curative components are mixed and the substrates married together; these intermediate steps may include, for example, frothing (if a cellular adhesive is wanted), degassing (if a non-cellular adhesive is wanted), gauging the adhesive layer, and the like. Sometimes, the long open time is necessary simply because it is not convenient to provide heat to accelerate the cure, and the long open time results because of the need to perform an ambient temperature cure.

Thus, in specific applications of particular interest, (a) the adhesive composition is cured at a temperature of 10 to 75° C., especially 15 to 65° C.; (b) the adhesive composition is devoid of tertiary amine catalysts and tin-containing catalysts, more preferably of any tertiary amine and phosphine compounds, metal chelates, acidic metal salts of strong acids; strong bases, metal alcoholates, metal phenolates, metal salts of organic acids, organometallic derivatives of tetravalent tin, trivalent and pentavalent As, Sb and Bi, and metal carbonyls of iron and cobalt; (c) the bond area is 0.25 square meters or more, especially one square meter or more, (d) the thickness of the adhesive layer is at least 10 mm, particularly from 10 to 50 mm, or (e) a combination of any two or more of conditions (a), (b) (c) and (d) exists.

The substrates used in the bonding process of the invention can be a wide range of metallic, polymeric, ceramic, cellulosic, lignocellulosic and/or composite materials. Fiber-reinforced organic polymers such as glass- or carbon-fiber filled polyesters, epoxies, polyurethanes, polyureas, and polyurethane-ureas are of particular interest as one or both of the substrates.

The following examples are provided to illustrate the invention but are not intended to limit the scope thereof. All parts and percentages are by weight unless otherwise indicated.

Examples 1-2 and Comparative Samples A-D

Six curative compositions are separately made by blending the components listed in Table 1.

TABLE 1

| | Parts By Weight | | | | | |
|---|---|---|---|---|---|---|
| Ingredient | Ex. 1 | Ex. 2 | Comp. Samp. A* | Comp. Samp. B* | Comp. Samp. C* | Comp. Samp. D* |
| Castor oil | 31.8 | 31.8 | 31.8 | 31.8 | 31.8 | 31.8 |
| 450 MW poly(propylene oxide) triol | 24 | 24 | 24 | 24 | 24 | 24 |
| Wetting agent | 0.6 | 0.6 | 0.6 | 0.6 | 0.6 | 0.6 |
| Calcium carbonate | 35.6 | 35.6 | 35.7 | 35.6 | 35.6 | 35.6 |
| Drying agent | 2.0 | 2.0 | 2.0 | 2.0 | 2.0 | 2.0 |
| Fumed silica | 5.0 | 5.0 | 5.0 | 5.0 | 5.0 | 5.0 |
| Amine (type, amount) | MACM[1], 1.3 | 50/50 MACM/ACM[2], 1.25 | ACM, 1.2 | DETDA[3], 1.0 | 50/50 ACM/DETDA, 1.1 | 50/50 MACM/DETDA 1.15 |

*Not an example of this invention.
[1] 3,3'-dimethyl-4,4'-diaminocyclohexylamine.
[2] 4,4'-diaminocyclohexylamine.
[3] Diethyltoluenediamine.

The ingredients listed in Table 1 are in each case mixed under vacuum, and then blended with polymeric MDI at a 110 index in a high speed mixture at room temperature. The resulting adhesive compositions are separately transferred to a plate and plate rheometer (AR2000 from TA Instruments) and the viscosity of each of the adhesive compositions is measured over time. The adhesive compositions then cures on the rheometer at 25° C. The amount of time until the viscosity reaches 400 Pa·s is determined. This time is recorded as an indication of "open time" for each of these adhesive compositions. Results are as indicated in Table 2. In this test, the amounts of MACM in Example 1 and ACM in Comparative Sample A are selected to provide 60 minutes open time in each case. Slightly less ACM than MACM (1.2% vs. 1.3% based on the entire curative component) is required to achieve the 60-minute open time. Increasing the amount of amine shortens the open time.

To evaluate sag resistance, a portion of each of the adhesive compositions is separately evaluated on a rheometer. In each case, the storage modulus (G) is measured as a function of oscillatory stress 3-8 minutes after mixing the isocyanate with the curative component, across a range of oscillitory stresses from 10 to 30 Pascals. The peak storage modulus is reported as the maximum yield stress value. The yield stress value and the corresponding oscillatory stress for each adhesive are as indicated in Table 2.

TABLE 2

| | Example or Comparative Sample Designation | | | | | |
|---|---|---|---|---|---|---|
| Property | 1 | 2 | A* | B* | C* | D* |
| Amine Type | MACM[1] | 50/50 MACM/ACM[2] | ACM | DETDA[3] | 50/50 ACM/DETDA | 50/50 MACM/DETDA |
| Open time, min[1] | 60 | 57 | 60 | 58 | 50 | 51 |
| Max. Yield Stress (Pa) | 2200 | 2100 | 1550 | 800 | 1350 | 800 |
| Oscillatory stress at max. yield stress, Pa | 13 Pa | 13 Pa | 12-13 Pa | 10 Pa | 10 Pa | 10 Pa |

*Not an example of the invention.
[1] 3,3'-dimethyl-4,4'-diaminocyclohexylamine.
[2] 4,4'-diaminocyclohexylamine.
[3] Diethyltoluenediamine.

The data in Table 2 shows that MACM and ACM provide the longest open times at the amine concentrations selected. At these amine concentrations, DETDA provides a slightly shorter open time, as does the mixture of ACM and MACM, whereas the ACM/DETDA and MACM/DETDA mixtures provide significantly shorter open times. The maximum yield stress data indicates the effectiveness of the various amines in providing sag resistance during the open time. The MACM (Ex. 1) and the 50/50 MACM/ACM mixture (Ex. 2) provide yield stress maxima that are much higher than the comparative samples. The yield stress maximum for the comparative samples could be increased by increasing the amount of amine in the formulation. However, doing so would lead to a significant decrease in open time, due to the faster reaction of the amine and the greater reaction rate seen due to the greater amount of exothermic heat that would be so generated by the reaction of the amine with the polyisocyanate. The excellent combination of open time and sag resistance (as indicated by maximum yield stress) is achieved only with the adhesive of the invention.

Example 1 and Comparative Sample A are repeated, this time reducing the amount of fumed silica in the curative component to 4 parts by weight and increasing the amount of calcium carbonate to 36.3 parts and 36.4 parts, respectively. The viscosity is measured as before until it reaches 400 Pa·s in each case, and G' is measured as a function of oscillatory stress, again as before. Results are shown graphically in FIGS. 1 and 2.

Figure 2:
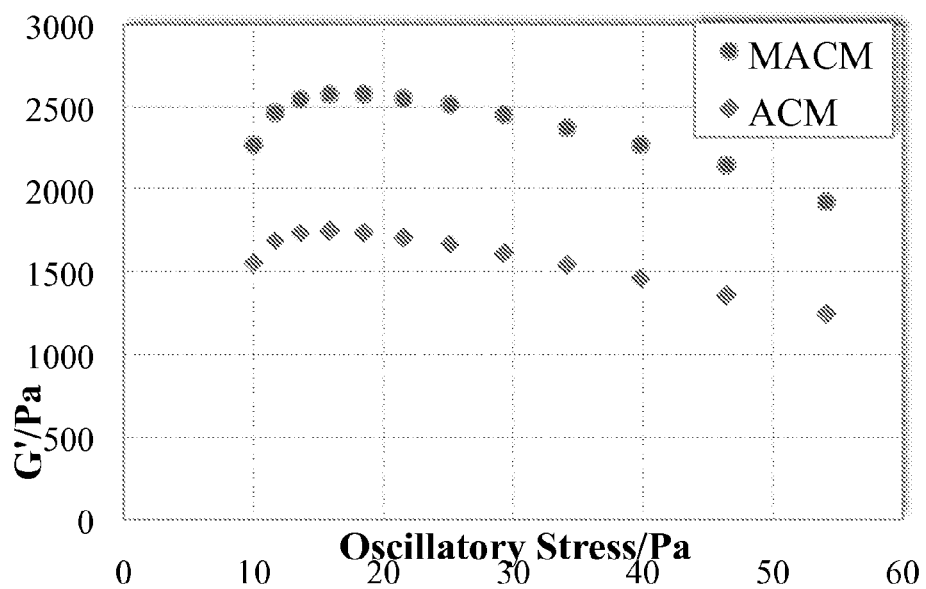
FIG. 2 is a graph showing the relationship between storage modulus and oscillatory stress for an adhesive composition of the invention (Example 1) and a comparative adhesive (Comp. Sample A).

In FIG. 1, the starting viscosity of the MACM-containing formulation (reference numeral 1) is much lower than that of the comparative ACM-containing formulation (reference symbol A). The viscosity of the MACM-containing formulation lags below that of the comparative formulation until both achieve a viscosity of 400 Pa·s after 60 minutes. Despite the lower viscosity of the MACM-containing formulation throughout this time period, the yield stress of the MACM-containing formulation of the invention, taken after about 8 minutes, is very much larger than that of the comparative ACM-containing formulation, across a range of oscillatory stresses. This is shown graphically in FIG. 2, in which the stress-strain curve of the MACM-containing formulation is indicated by reference numeral 1 and that of the comparative ACM-containing formulation is indicated by reference symbol A. FIGS. 1 and 2 together demonstrate that the MACM is highly effective at providing sag resistance and desirable thixotropic behavior without increasing viscosity (and in fact providing lower viscosities) at early stages of the reaction and while providing a long open time.

Examples 3 and 4

Adhesive Examples 3 and 4 are prepared from the curative compositions set forth in Table 3. Adhesive Example 3 is cured with polymeric MDI at a 110 index. Adhesive Example 4 is cured with a prepolymer made from 93.3% by weight polymeric MDI and 6.7% of a 400 molecular weight poly(propylene oxide) diol.

TABLE 3

| Ingredient | Example 3 | Example 4 |
|---|---|---|
| Castor oil | 31 | 30.9 |
| 450 MW poly(propylene oxide) triol | 20.6 | 20.8 |
| Bisphenol A-initiated poly(propylene oxide diol) | 5 | 0 |
| Wetting agent | 0.6 | 0.6 |
| Calcium carbonate | 35.8 | 40.0 |
| Drying agent | 2 | 2 |
| Fumed silica | 4 | 4.5 |
| MACM | 1 | 1.2 |

The time for each of these adhesives to attain a viscosity of 400 Pa·s is measured as an indication of open time in the manner described in previous examples. In addition, test bars are made from each of Examples 3 and 4 and the physical properties of the cured adhesive tested. Results are as indicated in Table 4.

TABLE 4

| Property (units) | Example 3 | Example 4 |
|---|---|---|
| Open time (min) | 68 | 62 |
| Tensile strength (MPa) (ASTM D638) | 33.8 | 37 |
| Tensile modulus (MPa) (ASTM D638) | 2860 | 2940 |
| Elongation at Break (%) (ASTM D638) | 19.05 | 12.9 |
| $T_g$ (° C.) (differential scanning calorimetry) | 47 | 57 |
| Lap Shear strength (MPa) (ISO 4587) | 24.5 | 24.5 |

What is claimed is:

1. A two-component polyurethane adhesive composition comprising an isocyanate component and a curative component, wherein the isocyanate component is an aromatic polyisocyanate or mixture of aromatic polyisocyanates and the curative component is a mixture containing (1) polyols wherein at least 90% of the hydroxyl groups provided by said polyols are secondary hydroxyl groups wherein the polyols include castor oil and a polyether polyol having a hydroxyl equivalent weight of 100 to 250 and a hydroxyl functionality of 2 to 6 and said castor oil and the polyether polyol having a hydroxyl equivalent weight of 100 to 250 together constitute at least 90% of the weight of the polyols and (2) at least one polyamine compound having at least two primary or secondary amine groups, wherein the polyamine compound constitutes 0.75 to 5% of the combined weight of the polyamine compound(s) and the polyol(s) and further wherein the polyamine compound is
(a) at least one alkyl-substituted 4,4'-di(aminocyclohexyl)alkane wherein each cyclohexyl group is alkyl-substituted in at least one position ortho to the amino group;
(b) at least one 2,4'-di(aminocyclohexyl)alkane or 2,2'-di(aminocyclohexyl)alkane;
(c) a mixture of (i) at least one alkyl-substituted 4,4'-di(aminocyclohexyl)alkane wherein each cyclohexyl group is alkyl-substituted in at least one position ortho to the amino group and (ii) at least one 2,4'-di(aminocyclohexyl)alkane and or 2,2'-di(aminocyclohexyl)alkane; or
(d) a mixture of 40 to 99.9% by weight (a), (b) or (c) with 0.1 to 60% by weight of at least one unsubstituted 4,4'-di(aminocyclohexyl)alkane,
and further wherein the polyol component contains no more than 0.25 weight percent of other primary or secondary amine-containing compounds.

2. The two-component polyurethane adhesive of claim 1, wherein the alkyl-substituted 4,4'-di(aminocyclohexyl)alkane has the structure:

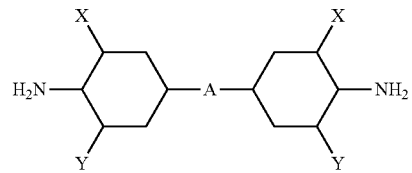

in which A is alkyl, each X is independently alkyl and each Y is independently hydrogen or alkyl.

3. The two-component polyurethane adhesive of claim 2, wherein the A group is gem-substituted with the two aminocyclohexyl groups, each X is independently alkyl having up to 4 carbon atoms, and each Y is independently hydrogen or alkyl having up to 4 carbon atoms.

4. The two-component polyurethane adhesive of claim 1, wherein the polyamine compound is 3,3'-dimethyl-4,4'-diaminocyclohexyl methane; 3,3'-diethyl-4,4'-diaminocyclohexyl methane, 3,5,3',5'-tetramethyl-4,4'-diaminocyclohexyl methane, 3,5,3',5'-tetramethyl-4,4-diaminocyclohexyl methane, 3,3'-di-t-butyl-4,4'-diaminocyclohexyl methane, 3,5,3',5'-tetra-t-butyldiaminecyclohexyl methane or a mixture of any two or more thereof.

5. The two-component polyurethane adhesive of claim 1, wherein the polyamine compound is a mixture of 40-99.9% by weight of the alkyl-substituted 4,4'-di(aminocyclohexyl)alkane and 0.1 to 60% by weight of an unsubstituted 4,4'-di(aminocyclohexyl)alkane.

6. The two-component polyurethane adhesive of claim 5, wherein the unsubstituted 4,4'-di(aminocyclohexyl)alkane is 4,4'diaminocyclohexyl methane.

7. The two-component polyurethane adhesive of claim 1, wherein the polyamine compound(s) are the only primary or secondary amine-containing compounds present in the curative component.

8. The two-component polyurethane adhesive of claim 1, wherein the polyamine compound(s) constitute from 1 to 4% of the combined weight of the polyols and the polyamine compound(s) in the curative component.

9. The two-component polyurethane adhesive of claim 1, wherein the polyols are devoid of tertiary amine groups.

10. The two-component polyurethane adhesive of claim 1, wherein the polyisocyanate is a polymeric MDI.

11. The two-component polyurethane adhesive of claim 1, wherein the polyisocyanate is a urethane group-containing prepolymer.

12. The two-component polyurethane adhesive of claim 1 which is devoid of tertiary amine and tin-containing catalysts.

13. The two-component polyurethane adhesive of claim 1, which is devoid of tertiary amine and phosphine compounds, metal chelates, acidic metal salts of strong acids; strong bases, metal alcoholates, metal phenolates, metal salts of organic acids, organometallic derivatives of tetravalent tin, trivalent and pentavalent As, Sb and Bi, and metal carbonyls of iron and cobalt.

14. The two-component polyurethane adhesive of claim 1, which further contains fumed silica and filler particles.

* * * * *